United States Patent
Bos et al.

(10) Patent No.: US 9,369,416 B2
(45) Date of Patent: Jun. 14, 2016

(54) AUTOMATED OUT-OF-OFFICE NOTIFICATION REMINDER

(71) Applicant: BlackBerry Limited, Waterloo (CA)

(72) Inventors: Jeffrey Charles Bos, Waterloo (CA); Gil Pinheiro, Cambridge (CA); Margaret Elizabeth Kuo, Kitchener (CA)

(73) Assignee: BlackBerry Limited, Waterloo, CA (US)

( * ) Notice: Subject to any disclaimer, the term of this patent is extended or adjusted under 35 U.S.C. 154(b) by 0 days.

(21) Appl. No.: 14/052,058

(22) Filed: Oct. 11, 2013

(65) Prior Publication Data

US 2014/0129648 A1    May 8, 2014

(30) Foreign Application Priority Data

Nov. 2, 2012 (CA) .................................... 2793997

(51) Int. Cl.
*H04L 12/58* (2006.01)
*G06Q 10/10* (2012.01)

(52) U.S. Cl.
CPC .............. *H04L 51/14* (2013.01); *G06Q 10/107* (2013.01); *H04L 12/58* (2013.01); *H04L 51/02* (2013.01)

(58) Field of Classification Search
CPC ....... G06F 15/16; G06F 17/30; G06Q 10/109; G06Q 10/107; H04L 51/14; H04L 12/58; H04L 51/28; H04L 51/02
USPC ......................................... 709/206, 204, 207
See application file for complete search history.

(56) References Cited

U.S. PATENT DOCUMENTS

| | | |
|---|---|---|
| 2004/0044674 A1 | 3/2004 | Mohammadioun et al. |
| 2006/0168062 A1* | 7/2006 | Hebert et al. ................. 709/206 |
| 2008/0104175 A1* | 5/2008 | Keohane ............. G06Q 10/107 709/206 |
| 2008/0104177 A1 | 5/2008 | Keohane et al. |
| 2008/0133302 A1* | 6/2008 | Brauninger .......... G06Q 10/109 379/88.19 |
| 2009/0018848 A1* | 1/2009 | Vanstaaveren .................... 705/1 |
| 2009/0077183 A1 | 3/2009 | Bruce et al. |
| 2009/0235280 A1 | 9/2009 | Tannier et al. |
| 2010/0174787 A1 | 7/2010 | Gupta et al. |
| 2010/0217644 A1 | 8/2010 | Lyle et al. |
| 2011/0153753 A1* | 6/2011 | Childress et al. ............ 709/206 |
| 2011/0191424 A1 | 8/2011 | Cumming et al. |
| 2011/0302251 A1 | 12/2011 | Meunier et al. |
| 2012/0121075 A1* | 5/2012 | Strasters ............. H04L 12/2898 379/93.23 |

OTHER PUBLICATIONS

Office Action for Canadian Patent Application No. 2,793,997 dated Feb. 1, 2013.
Office Action for Canadian Patent Application No. 2,793,997 dated Jun. 10, 2013.

* cited by examiner

*Primary Examiner* — Oleg Survillo
*Assistant Examiner* — Mehulkumar Shah
(74) *Attorney, Agent, or Firm* — Moffat & Co.

(57) ABSTRACT

A method performed by a network element, and the network element, the method determining, according to a triggering event, whether out-of-office messaging is active for an electronic mail account; and providing a notification that the out-of-office messaging is active based on the determining.

16 Claims, 6 Drawing Sheets

AUTOMATED OUT-OF-OFFICE NOTIFICATION REMINDER

FIELD OF THE DISCLOSURE

The present disclosure relates to electronic mail and in particular relates to out-of-office messaging for electronic mail.

BACKGROUND

An out-of-office feature, or vacation mode feature, is a common mechanism among electronic mail (e-mail) systems. It allows a user to notify senders of e-mails, which are received at the user's email account or inbox, that the user will either not respond to an incoming message, or will be delayed in responding, due to the user being out of the office or on vacation.

Out-of-office messaging rules vary depending on the type of e-mail system employed by the user, and can include a rule to merely reply to all e-mails indicating that the user is out of the office for a certain amount of time, a rule providing a period of time during which the out-of-office response is sent, rules setting various levels of responses depending on the sender of the original message, among others.

Sometimes a user forgets to turn off the out-of-office setting when the user returns to the office. This is especially true if the user merely turns on the out of office feature without configuring a return date option in the application to deactivate automatic notifications. Further, in cases when a period of time to provide out-of-office messages is specified, the user may return to the office early and forget that an out-of-office message is being sent. In either case, the out of-office should no longer be sent once the user returns to the office.

BRIEF DESCRIPTION OF THE DRAWINGS

The present disclosure will be better understood with reference to the drawings, in which.

DETAILED DESCRIPTION

The present disclosure provides a method performed by a network element, the method comprising: determining, according to a triggering event, whether out-of-office messaging is active for an electronic mail account; and providing a notification that the out-of-office messaging is active based on the determining.

The present disclosure further provides a network element comprising: a processor; and a communications subsystem, wherein the network element is configured to: determine, according to a triggering event, whether out-of-office messaging is active for an electronic mail account; and provide a notification that the out-of-office messaging is active based on the determining.

Figure 1:
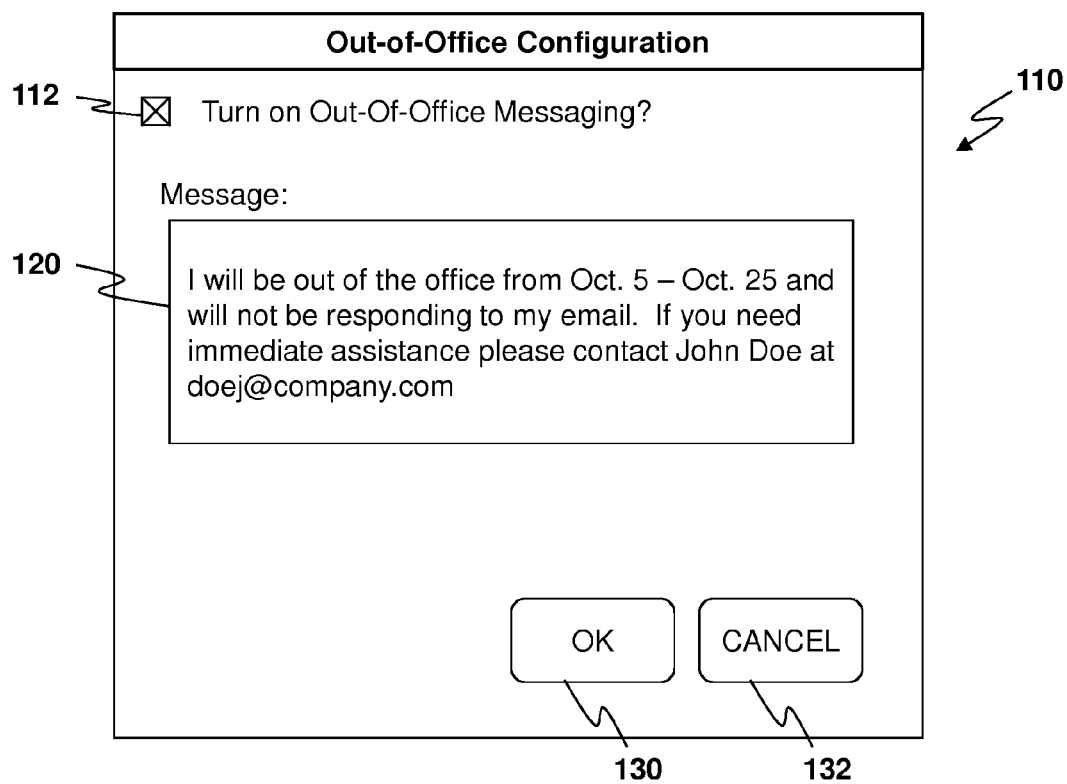
FIG. 1 is a block diagram of an example user interface for configuring out-of-office messaging.

Reference is now made to FIG. 1, which shows a user interface for a user to manage an out-of-office feature in an e-mail system. In particular, an interface 110 includes a checkbox 112 or button to turn on (or off) out-of-off ice messaging. The messaging provides for an auto reply to e-mails received, and provides an action to send the message shown by box 120 back to the original sender.

Typical messages can indicate that the user is out of the office for a given time frame. For example, as shown in FIG. 1, a message may indicate that the user is out of the office from October $5^{th}$ to October $25^{th}$ and provide the sender of the original e-mail with alternative contact information. In other cases, the message at box 120 may indicate that the user is out of the office until a certain date rather than specifying a date range.

Once the checkbox 112 has been selected and a message input into box 120, the user can then either select okay, as shown by button 130, or cancel, as shown by button 132. If the user selects okay then the e-mail system has an out of office rule configured, which may either start immediately or, in some systems, start at a specified date or time. The e-mail system may or not show a graphic to indicate that an out-of-office rule has been set.

Once a user returns from vacation or otherwise being away from his or her email, the user may then start the user interface of FIG. 1 and unclick the checkbox 112 to turn off the out of office messaging in one embodiment. In other cases a graphic which indicates that an out of office configuration is enabled may be clicked in order to turn off the out of office messaging, among other options.

In other embodiments, rather than the interface of FIG. 1, a user may be able to specify a date range that the user is out of the office. For example, the interface may provide a calendar button which, when clicked, can bring up a calendar and allow the user to select the specific dates the user will be out of the office. This then automatically enables the out of office message to start at the start date and end on an end date.

Regardless of the configuration, users often forget to turn their out of office reminder off after returning to work.

Further, even in cases where a date range is set, a user may return to the office early or late, and thus the actual dates the user is out of the office may differ from those configured by an interface. The automatic removal of the out-of-office may be problematic if the user has been delayed from returning to the office, since those wishing to contact the user may assume the user is back in the office as the out of office messaging has been disabled.

Figure 2:
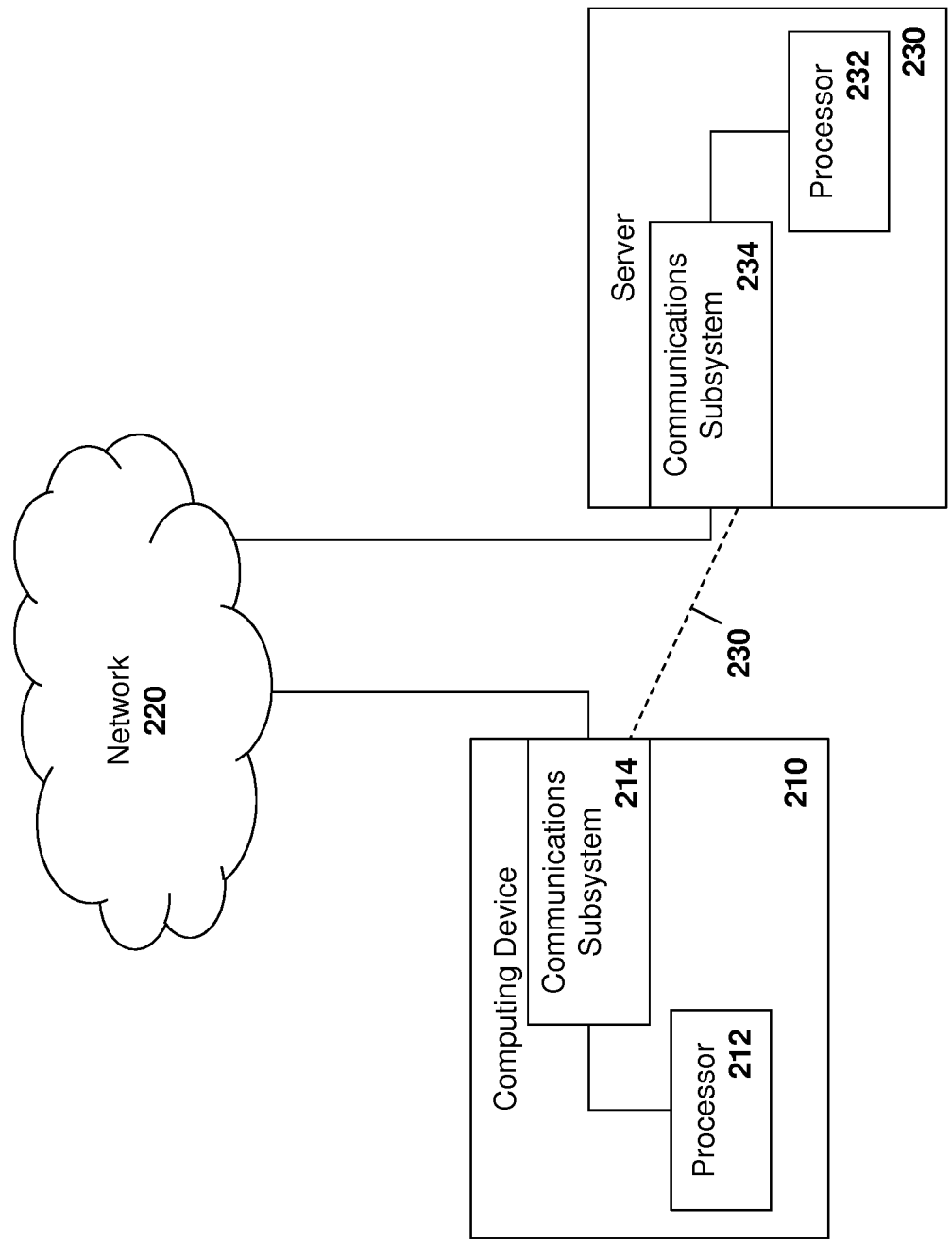
FIG. 2 is a block diagram of an example e-mail system.

The e-mail system described above can be implemented in various network environments. An example network environment is shown with regard to FIG. 2. In FIG. 2, a computing device 210 is in communication with other network elements through a network 220. In some embodiments network 220 is the Internet.

Computing device 210 includes at least a processor 212 to perform actions such as executing computer-readable instructions, and a communications subsystem 214 to enable communications with the network 220. In many embodiments, computing device 210 will further include a tangible or non-transitory medium such as memory (not shown) to store the computer-readable instructions, software and data such as configuration information.

Computing device 210 may be any type of computing device, and examples include a desktop computer, a laptop or notebook computer, a mobile device such as a smartphone, a tablet, among others.

In one embodiment, the e-mail system may be served from computing device 210. In this case, the configuration of the out-of-office messaging and the turning off of the out-of-office may be done completely on computing device 210.

In other embodiments an e-mail server or other network server device 230 may provide for the e-mail system. Server device 230 may communicate with computing device 210 either directly (for example through a local network), as shown by link 236, or through network 220.

E-mail server device 230 typically will include at least one processor and a communications subsystem, as shown by reference numerals 234 and 236 respectively. The server device 230 may also include a tangible or non-transitory medium such as memory (not shown) to store computer-readable instructions to be executed by the processor 232 to instantiate a server agent and effect e-mail functionality.

In the case of systems using an e-mail server executed by server device 230, the processing of the out-of-office messaging may occur at either the e-mail server of device 230 or at computing device 210. However, typically the configuration of the out-of-office messaging will still occur using computing device 210.

E-mail server of device 230 could be a variety of servers. For example, it could be a Microsoft Exchange™ Server or a Novell Groupwise™ Server, among others, for an enterprise. In other cases e-mail server could be a server for an Internet accessible mail system. For example, a GMAIL™ or YAHOO™ mailbox may be hosted on a network server accessible through the Internet by a computing device 210.

In some cases, the e-mail system may be further linked to a mobile device. An example architecture is shown with regard to FIG. 3, in which a mobile device 310 communicates, either through an access point 312 or a cellular network 314, with an e-mail server of server device 320. Again, server device 320 could include a processor 322 and a communications subsystem 324.

The communication may be done through a variety of means including a network 340 such as the Internet, or a relay 350, among others.

Figure 3:
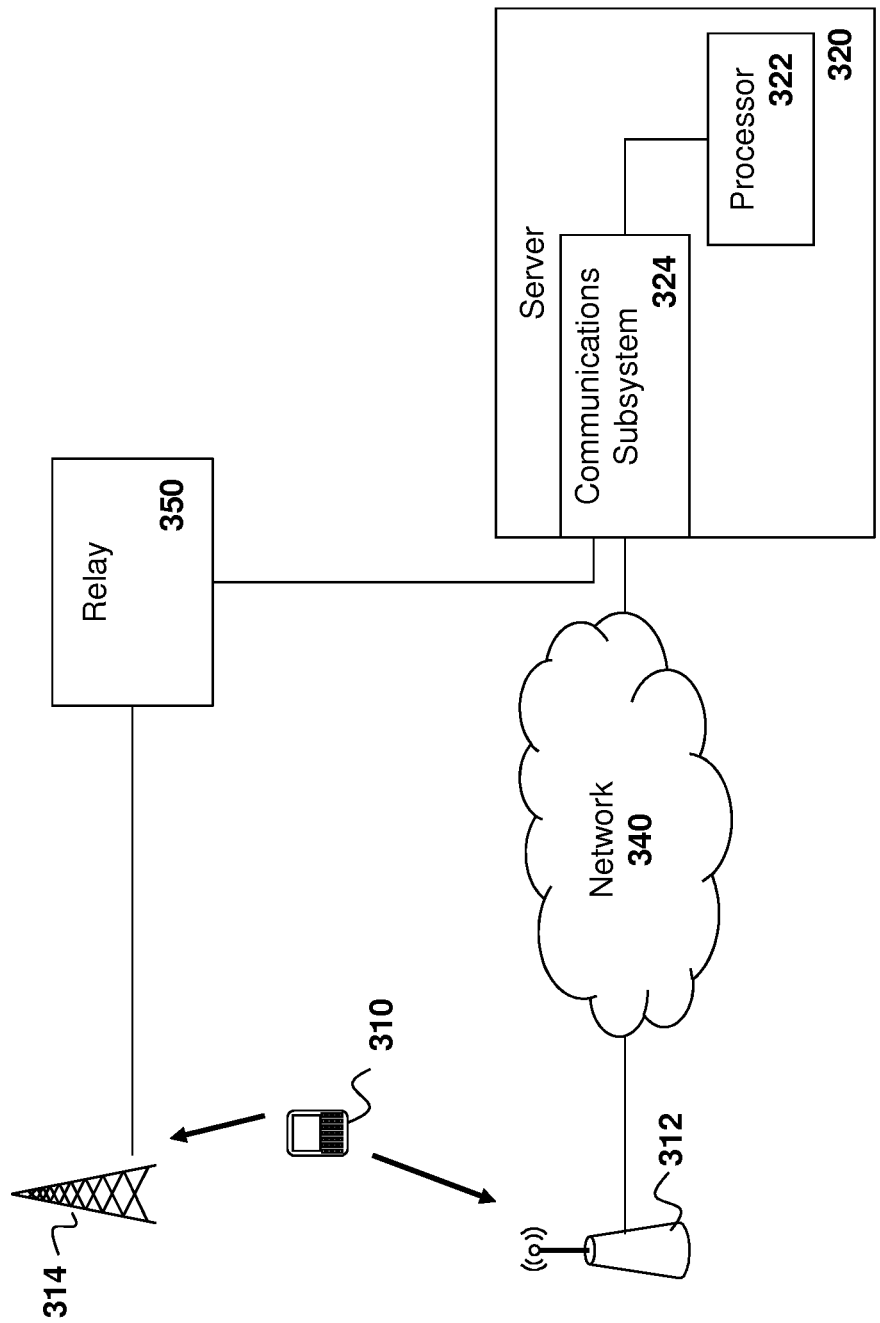
FIG. 3 is a block diagram of an example e-mail system including a mobile device.

The example of FIG. 3 is only meant to be an example and other network elements and configurations are possible. For example, the server executed by device 320 may be behind a firewall and may also communicate through other network elements such as an enterprise server in some embodiments. Other examples and network elements would be known to those in the art.

Even with the embodiment of FIG. 3, where a mobile device 310 allows a travelling user to access e-mail, in some cases the out-of-office may be configured, since it may be difficult, even with a mobile device 310, to respond to e-mails in a timely manner or at all for example in an instance when the device was not capable or provisioned for reception of data while roaming.

Figure 4:
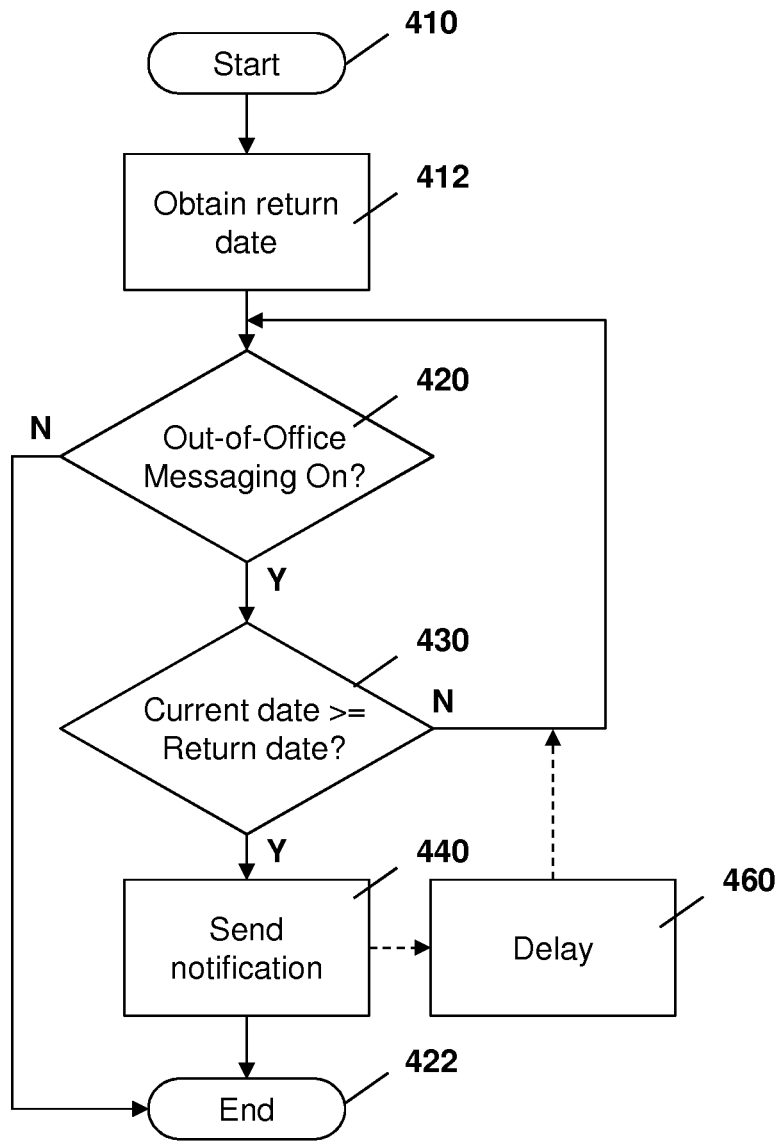
FIG. 4 is a flow diagram showing an example process for providing a notification if a date or time exceeds a return time.

Whatever the configuration of the e-mail system, the out-of-office messaging should be turned off once the user returns to the office or is otherwise able to access his or her email account or inbox. In accordance with one embodiment of the present disclosure, a user is provided with a notification when the configured out-of-office return date has passed and the out-of-office messaging is still on. Reference is now made to FIG. 4.

FIG. 4 shows one example process for providing a notification of out-of-office messaging being left on after the expiration of the time specified within the messaging. The example of FIG. 4 however is not meant to be limiting.

The process of FIG. 4 starts at block 410 and proceeds to block 412 in which a network element or computing device obtains a return date. The network element may be the e-mail server or some other network entity on the e-mail path.

The obtaining of the return date can be done in various ways. For example, if a user interface such as that specified in FIG. 1 provides for a calendar to set the return date, the return date may be obtained directly from such calendar selection.

In other embodiments, the out-of-office message itself may be processed to identify the return date. For example, if a message says "I will be out of the office from October $5^{th}$ to October $25^{th}$" then a computing device or any network element on the e-mail path may parse such message. In the example above, the parsing finds that two dates are specified, and the computing device or network elements are configured to understand that the later date is the return date and the earlier date is the start date.

In other cases, the message may read "I am out of the office until October $25^{th}$." In this case, the parsing would only find one date such that it is understood that the date found is the return date.

In other examples, the parsing may identify a relative date rather than an exact or explicit date. For example, if an out of office message indicates "I will be out of the office until Thursday" then the parsing may take the current date and find the next occurrence of a Thursday and populate the return date with that date. Similarly the parsing for terms such as "I will be out of the office for the rest of the week" or "for this week" may similarly populate the return date field with the following Monday. Other examples of parsing would also be applicable to the present disclosure.

The parsing may occur either at the time the out-of-office messaging is configured, or at a subsequent time. If the parsing occurs after the out-of-office configuration, any network element on the e-mail path can perform the parsing. Further, a network element may monitor e-mail in general and note the out-of-office message, thereby triggering the parsing.

Once the return date is obtained by the computing device or network element, the process proceeds to block 420 in which a check is made to determine whether the out-of-office messaging is on or active.

If the out of office message has been turned off then the process proceeds to block 422 and ends. In some embodiments (not shown) a check may further exist before block 420 to ensure the out-of-office messaging has previously been started, to avoid having the process end before the start date.

When the out of office message is on, the process then proceeds to block 430 in which a check is made to see whether or not the current date and/or time is before or after the return date and/or time that was obtained at block 412.

If the current date is before the return date, the process loops back to block 420 until either the out-of-office messaging is turned off or the current date is determined to be the same as or after the return date and/or time.

The process then proceeds to block 440 in which a notification is provided by the computing device or a network element to the user of the e-mail system. The notification may take a variety of forms including a pop-up on the computing device or mobile device of the user indicating that the out-of-office messaging is still on or active. The notification may also be in the form of an e-mail, short message service (SMS), instant message (IM), among others.

In some embodiments the notification may allow the out-of-office messaging to be automatically turned off. For example, a notification may indicate that the out-of-office messaging is on, and ask whether the user wants to turn it off. If an input is registered indicating selection of the option to turn off the out-of-office messaging, then the server or computing device may turn off the out-of-office messaging. This may occur by providing signaling between the device displaying the notification and the device or server on which the e-mail system is configured.

In other embodiments, a user may be prompted to log into the mail system and turn off the out-of-office messaging manually.

Once the notification has occurred, in one embodiment the process then proceeds to block 422 and ends. In other embodiments, the process could instead add a delay, as shown by block 460, and then loop back to block 420, thereby providing periodic out-of-office deactivation reminders. For example, a delay of four hours could be introduced, whereby if the out-of-office messaging is not deactivated by the end of the delay a further notification would be sent, based on the checks at blocks 420 and 430.

In some embodiments, instead of continually looping between the blocks 420 and 422, a flag could be set on the computing device or network server to cause an interrupt or event trigger to notify the user that the out-of-office message is still on. Other alternatives also exist.

In still other embodiments, the check at block 420 could be omitted. In this case the computing device or server would simply send a reminder notification on the return date identified in block 412.

Figure 5:
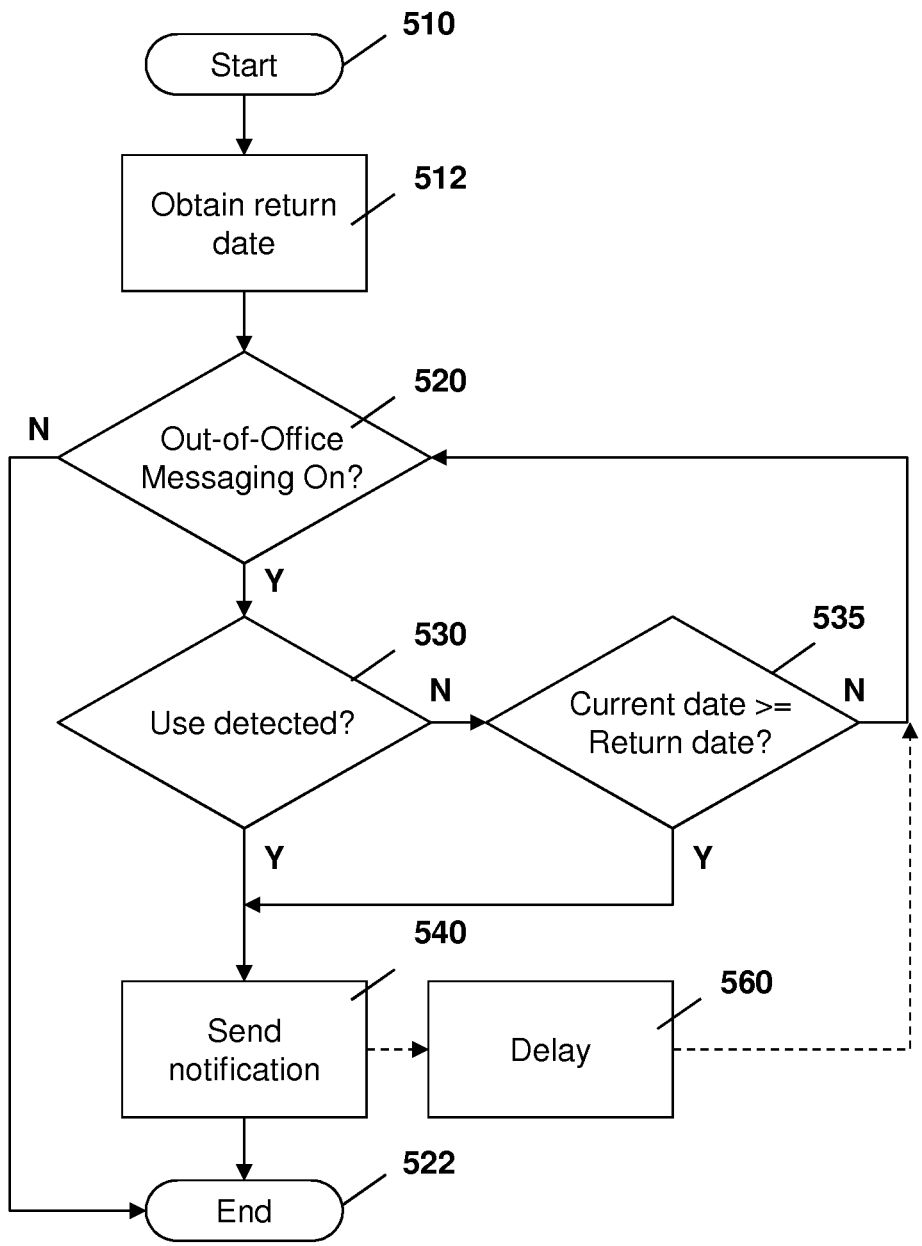
FIG. 5 is a flow diagram showing an example process for providing a notification if use of the e-mail system is detected or if a date or time exceeds a return time.

In a further embodiment, instead of merely relying on a return date, the use of the e-mail system may itself trigger an alarm or notification to the user. Reference is now to FIG. 5, which shows a process for providing a notification based on a trigger.

The process of FIG. 5 starts at block 510 and proceeds to block 512 in which a return date is obtained. The obtaining of the return date can be done in a manner similar to that of the return date obtaining at block 412 of FIG. 4.

The process then proceeds to block 520 in which a check is made to determine whether or not out-of-office messaging is on or active. If not, and the out-of-office messaging is not waiting for a future start date, the process proceeds to block 522 and ends.

From block 520, if the out of office is still on, the process proceeds to block 530 in which a check is made to see whether or not use is detected of the user's e-mail inbox or account.

In some embodiments, any use of the user's e-mail inbox or account may trigger a notification. Thus, for example, with the embodiment of FIG. 2, if the e-mail system exists only on one computing device, use of the e-mail system on that computing device may indicate that the user has returned.

In other embodiments, the detection of use at block 530 may be selective. For example, the checking of e-mail on a mobile device 310 may not qualify as use of the e-mail system for the check of block 530 in order to trigger a notification to the user.

The use of the e-mail system as detected at block 530 may also be geographically dependent. Thus, for example, the use may qualify for a notification if on a computing device at the user's office, and may not qualify for notification if over an internet connection from a hotel room or internet café. Other embodiments are possible, and the use as detected at block 530 may be defined based on an e-mail configuration.

If the check at block 530 determines that there is use of the user's e-mail inbox or account, the process proceeds to block 540 and a notification is generated and provided to the user that his or her out-of-office messaging is still on.

Thus, for example, if the user returns to the office earlier than the originally set date obtained from the out-of-office messaging, the embodiment of FIG. 5 will detect this and provide a notification to the user.

Conversely, if no use is detected at block 530 the process then proceeds to block 535 to determine whether the current date is before or after the return date obtained at block 512. If the current date is before the return date, the process can loop back to block 520 and continue to check whether there has been use or whether the date or time has passed.

From block 535, if the current date or time is the same as or after the return date or time, then the process proceeds to block 540 and provides a notification.

In this case, since no use has been detected, the notification may further prompt the user whether or not they wish to extend the out-of-office return time in some embodiments. Further, the notification at block 540 can prompt a user whether or not the out of office should be turned off in some embodiments.

From block 540 the process proceeds to block 522 and ends.

In an alternative embodiment, instead of ending, the process may proceed from block 540 to a delay block 560 and then loop back to block 520, thereby providing periodic out-of-office deactivation notifications that the out-of-office messaging remains on.

Thus, based on the embodiments of FIGS. 4 and 5, a network element, such as a server, computing device, mobile device, among others, determines that the out-of-office messaging is still active after a triggering event, such as the current date exceeding the return date, or use of the e-mail system. Based on the determination, the network element provides a notification that the out-of-office messaging is still active.

In the embodiments of FIGS. 4 and 5, the notification provided to a user may be configurable. The configuration may, for example, be done by a user or system administrator. The preferred method of notification could be set in one embodiment. Thus a choice could be made between an e-mail or instant message, for example.

Further, the delay between notifications could be configured.

In some cases, the time of day a first notification is sent could be specified. Thus, for example, a user may not wish to receive a notification at 12:01 am on the return date, but would rather receive the notification at 10 am if the out-of-office messaging has not yet been turned off.

In some cases the action a user can take within the notification could be configured. Thus, a link could be provided in an e-mail which would turn off the out-of-office messaging. A pop-up notification could have buttons for turning off the out-of-office notification. Such buttons or links may be configurable in some embodiments.

Figure 6:
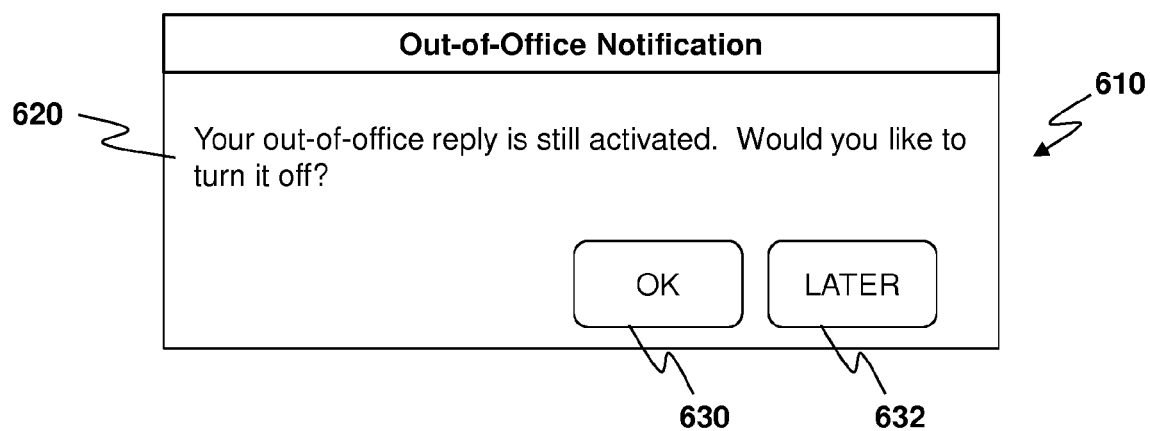
FIG. 6 is a block diagram of an example user interface notification.

An example notification is shown with regards to FIG. 6. In the example of FIG. 6, notification 610 includes a message 620 and buttons 630 and 632. Button 630 could be used to turn off the out-of-office messaging, whereas button 632 could be used to postpone turning off the out-of office messaging.

The embodiment of FIG. 6 is however not limiting, and other examples of notifications are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A network element comprising:
a computer processor; and
a communications subsystem configured for sending and receiving electronic mail messages,
wherein the network element is configured to:
determine, via the computer processor, for a user of an electronic mail account, whether out-of-office messaging is active for the user of the electronic mail account;
upon determining that the out-of-office messaging is active, determine whether there has been use of the electronic mail account by the user of the electronic mail account prior to a return date configured for the out-of-office messaging;
upon determining that there has been use of the electronic mail account prior to the return date from a predefined location, provide a notification to the user of the electronic mail account that the out-of-office messaging is still active and restrict further notifications for a predetermined period; and
upon determining that there has been use of the electronic mail account prior to the return date from a location other than the predefined location, provide no notification to the user that the out-of-office messaging is still active.

2. The network element of claim 1, wherein the return date is configured on a user interface during out-of-office messaging activation.

3. The network element of claim 1, wherein the return date is parsed from a message sent within a user interface during out-of-office messaging activation.

4. The network element of claim 1, wherein the notification is one of a pop-up message, an electronic mail message, an instant message, and a short message service message.

5. The network element of claim 1, wherein the notification provides an option to deactivate the out-of-office messaging.

6. The network element of claim 1, wherein a format for the notification is configurable within the electronic mail account.

7. The network element of claim 1, wherein the network element is one of a server, a computing device, and a mobile device.

8. The network element of claim 1, further configured to:
determine whether the return date has passed; and
upon determining that the return date has passed, send a notification to the user of the electronic mail account asking whether the out of office messaging should be extended.

9. A non-transitory computer-readable storage medium comprising computer-executable instructions, which when executed by a computer processor of a network element are configured to:
determine, via the computer processor, for a user of an electronic mail account, whether out-of-office messaging is active for the user of the electronic mail account;
upon determining that the out-of-office messaging is active, determine whether there has been use of the electronic mail account by the user of the electronic mail account prior to a return date configured for the out-of-office messaging;
upon determining that there has been use of the electronic mail account prior to the return date from a predefined location, provide a notification to the user of the electronic mail account that the out-of-office messaging is still active and restrict further notifications for a predetermined period; and
upon determining that there has been use of the electronic mail account prior to the return date from a location other than the predefined location, provide no notification to the user that the out-of-office messaging is still active.

10. The non-transitory computer-readable storage medium of claim 9, wherein the return date is configured on a user interface during out-of-office messaging activation.

11. The non-transitory computer-readable storage medium of claim 9, wherein the return date is parsed from a message set within a user interface during out-of-office messaging activation.

12. The non-transitory computer-readable storage medium of claim 9, wherein the notification is one of a pop-up message; an electronic mail message; an instant message, and a short message service message.

13. The non-transitory computer-readable storage medium of claim 9, wherein the notification provides an option to deactivate the out-of-office messaging.

14. The non-transitory computer-readable storage medium of claim 9, wherein a format for the notification is configurable within the electronic mail account.

15. The non-transitory computer-readable storage medium of claim 9, wherein the network element is one of a server, a computing device and a mobile device.

16. The non-transitory computer readable storage medium of claim 9, wherein the computer-executable instructions are further configured to:
determine whether the return date has passed; and
upon determining that the return date has passed, send a notification to the user of the electronic mail account asking whether the out of office messaging should be extended.

* * * * *